(12) United States Patent
Anderson et al.

(10) Patent No.: US 9,376,926 B2
(45) Date of Patent: Jun. 28, 2016

(54) GAS TURBINE ENGINE FAN BLADE LOCK ASSEMBLY

(71) Applicant: United Technologies Corporation, Hartford, CT (US)

(72) Inventors: Carney R. Anderson, East Haddam, CT (US); Peter V. Tomeo, Middletown, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 871 days.

(21) Appl. No.: 13/677,470

(22) Filed: Nov. 15, 2012

(65) Prior Publication Data

US 2014/0133991 A1    May 15, 2014

(51) Int. Cl.
*F01D 5/30* (2006.01)
*F01D 5/32* (2006.01)

(52) U.S. Cl.
CPC .............. *F01D 5/3015* (2013.01); *F01D 5/323* (2013.01); *Y02T 50/673* (2013.01)

(58) Field of Classification Search
CPC ..... F01D 5/3053; F01D 5/3015; F01D 5/323; F01D 5/326
USPC ...................................... 416/220 R
See application file for complete search history.

(56) References Cited

U.S. PATENT DOCUMENTS

| | | | | |
|---|---|---|---|---|
| 4,033,705 A | * | 7/1977 | Luebering | F01D 5/326 416/220 R |
| 5,112,193 A | * | 5/1992 | Greer | F01D 5/3015 416/220 R |
| 5,263,823 A | * | 11/1993 | Cabaret | F01D 11/006 416/218 |
| 5,522,702 A | | 6/1996 | Kemsley et al. | |
| 6,416,280 B1 | | 7/2002 | Forrester et al. | |
| 6,457,942 B1 | | 10/2002 | Forrester | |
| 6,481,971 B1 | | 11/2002 | Forrester | |
| 6,764,282 B2 | | 7/2004 | Suciu et al. | |
| 7,040,866 B2 | * | 5/2006 | Gagner | F01D 5/3015 416/220 R |
| 7,153,098 B2 | | 12/2006 | Zabawa | |
| 7,153,102 B2 | | 12/2006 | Stone | |
| 2001/0007633 A1 | * | 7/2001 | Brioude | F01D 21/045 416/221 |
| 2009/0022593 A1 | * | 1/2009 | Oka | F01D 5/3015 416/220 R |

\* cited by examiner

*Primary Examiner* — Nathaniel Wiehe
*Assistant Examiner* — Woody A Lee, Jr.
(74) *Attorney, Agent, or Firm* — Carlson, Gaskey & Olds, P.C.

(57) ABSTRACT

A gas turbine engine fan blade lock assembly includes a fan hub that has blade slots each configured to receive a root of a fan blade. The fan hub includes circumferentially spaced first slots. A lock ring is configured to move between unlocked and locked positions. The lock ring includes circumferentially spaced second slots aligned with the first slots in the locked position, and multiple discrete pins. Each pin is configured to be slidably received in paired first and second slots in the locked position to prevent rotational movement of the lock ring relative the fan hub.

17 Claims, 5 Drawing Sheets

GAS TURBINE ENGINE FAN BLADE LOCK ASSEMBLY

BACKGROUND

This disclosure relates to a fan blade lock assembly of a gas turbine engine fan section.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One type of gas turbine engine includes a fan drive gear system having a fan section with relatively large fan blades. The fan blades are mounted to a fan hub, and a blade lock assembly is used to axially retain the fan blades within corresponding fan hub slots. One example blade lock assembly includes a lock ring that is axially slid onto the fan hub in an unlocked position and rotated to a locked position. In the locked position, fan hub and lock ring tabs are aligned with one another to prevent axial movement of the lock ring with respect to the fan blades. A retaining ring, or pilot ring, having circumferentially spaced prongs is mounted to the fan hub with the prongs received in spaces between the lock ring and fan hub. The retaining ring is bolted to the fan hub. A nose cone is located by the retaining ring.

SUMMARY

In one exemplary embodiment, a gas turbine engine fan blade lock assembly includes a fan hub that has blade slots each configured to receive a root of a fan blade. The fan hub includes circumferentially spaced first slots. A lock ring is configured to move between unlocked and locked positions. The lock ring includes circumferentially spaced second slots aligned with the first slots in the locked position, and multiple discrete pins. Each pin is configured to be slidably received in paired first and second slots in the locked position to prevent rotational movement of the lock ring relative the fan hub.

In a further embodiment of any of the above, the first and second slots are arcuate in shape and include a radial gap provided between the first and second slots that receives the pin. The pin engages the lock ring and the fan hub in an interference fit.

In a further embodiment of any of the above, the pin is cylindrical in shape.

In a further embodiment of any of the above, the pin includes an end with a threaded hole configured to cooperate with a tool during a removal procedure.

In a further embodiment of any of the above, the fan hub includes hub tabs circumferentially spaced apart from one another to provide first circumferential spaces between the hub tabs. The lock ring includes circumferentially spaced ring tabs that are received in the first circumferential spaces in the unlocked position.

In a further embodiment of any of the above, the lock ring includes second circumferential spaces provided between the ring tabs and receiving the hub tabs in the unlocked position.

In a further embodiment of any of the above, the ring tabs are received in an annular space provided between the hub tabs and the blade slots. The hub tabs and ring tabs at least partially circumferentially aligned with one another in the locked position.

In a further embodiment of any of the above, the pin includes an end that is generally flush with a face of the hub tab in the locked position.

In a further embodiment of any of the above, gas turbine engine fan blade lock assembly includes a retainer blocking the pin end.

In a further embodiment of any of the above, a nose cone provides the retainer.

In a further embodiment of any of the above, gas turbine engine fan blade lock assembly includes a fan blade mounted within the slot, and the lock ring adjacent to the root.

In one exemplary embodiment, a method of assembling a fan section of a gas turbine engine includes the steps of mounting fan blades into a fan hub, sliding a lock ring onto the fan hub, rotating the lock ring to axially retain the fan blades within the fan hub, and inserting discrete pins into aligned apertures in the fan hub and lock ring to prevent relative rotational movement between the lock ring and fan hub.

In a further embodiment of any of the above, the mounting step includes sliding roots of the fan blades into the corresponding slots in the fan hub.

In a further embodiment of any of the above, the sliding step includes axially sliding the lock ring onto the fan hub with ring tabs of the lock ring received in circumferential spaces provided between hub tabs of the fan hub.

In a further embodiment of any of the above, the rotating step includes circumferentially aligning at least a portion of the hub tabs with the ring tabs, wherein the lock ring axially blocks the axial movement of the fan blade roots.

In a further embodiment of any of the above, the inserting step includes providing a desired radial space between the lock ring and the fan hub with the pins received in the apertures.

In a further embodiment of any of the above, the pins are received in an interference fit in arcuate slots providing the apertures.

In a further embodiment of any of the above, the method of assembly includes a method of reassembly, wherein the pins are slidingly hammered from the slots.

BRIEF DESCRIPTION OF THE DRAWINGS

The disclosure can be further understood by reference to the following detailed description when considered in connection with the accompanying drawings wherein.

DETAILED DESCRIPTION

Figure 1:
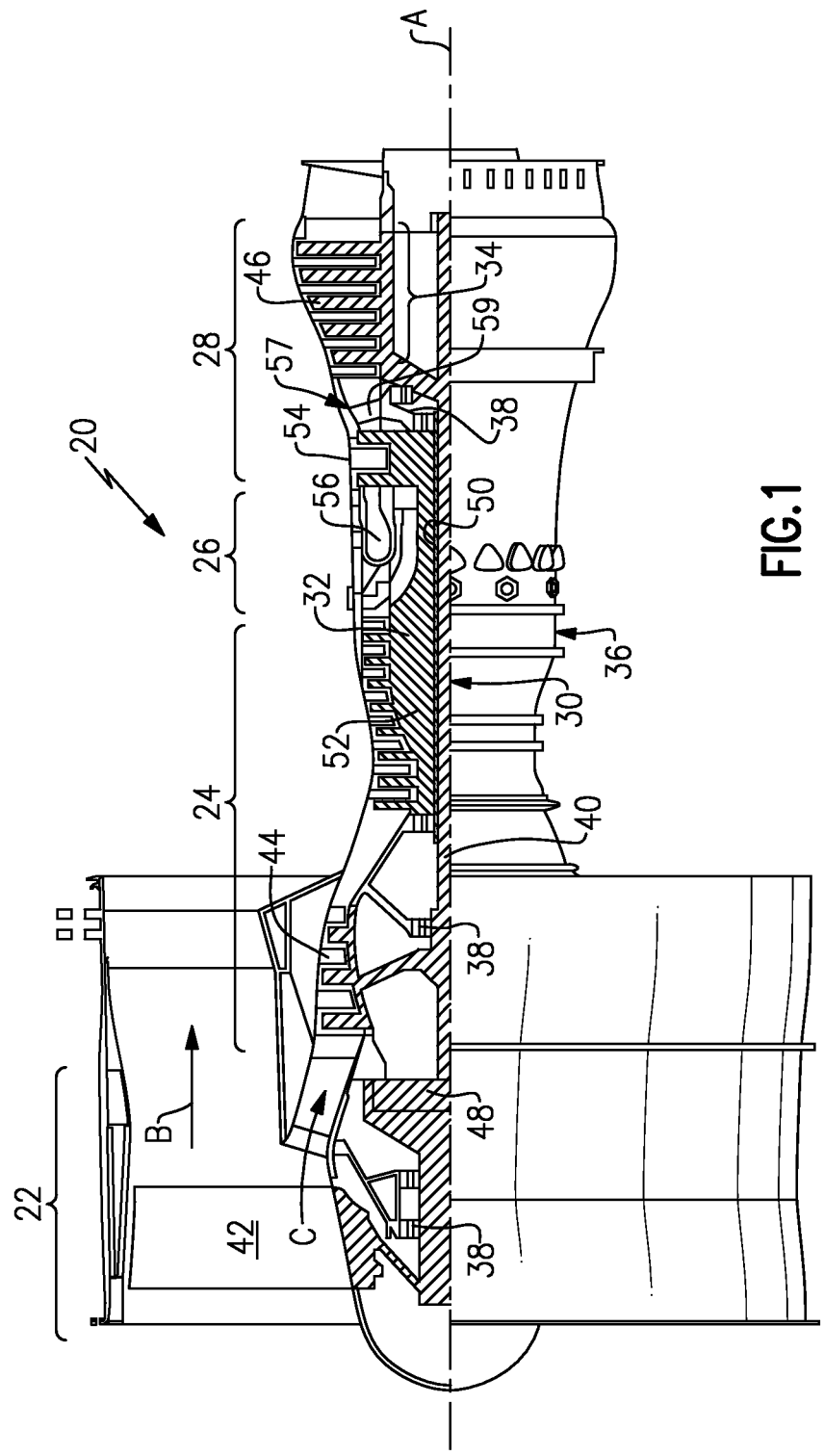
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan having fan blades 42 and a low pressure (or first) compressor section 44 to a low pressure (or first) turbine section 46. The inner shaft 40 drives the fan blades 42 through a speed change device, such as a geared architecture 48, to drive the fan blades 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

Figure 2A:
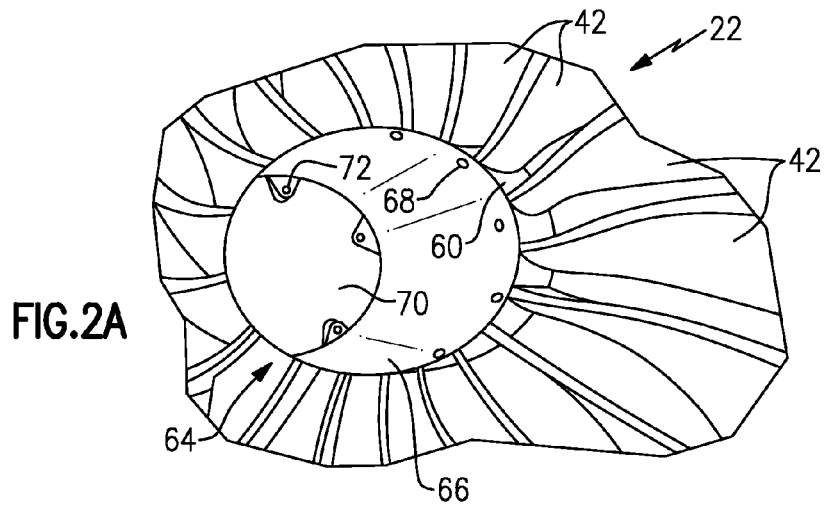
FIG. 2A is a perspective view of a portion of a fan section.
Figure 2B:
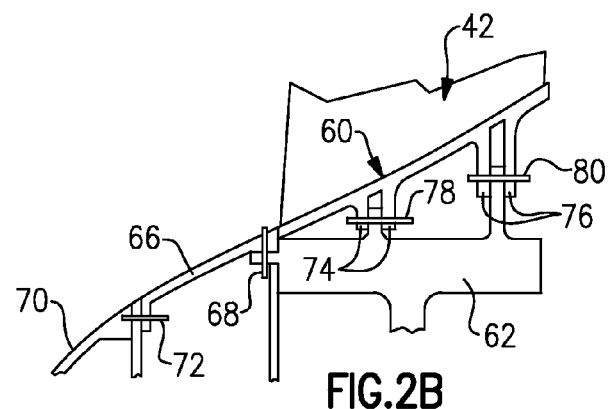
FIG. 2B is a schematic cross-sectional view through a portion of the fan section shown in FIG. 2A.
Figure 2C:
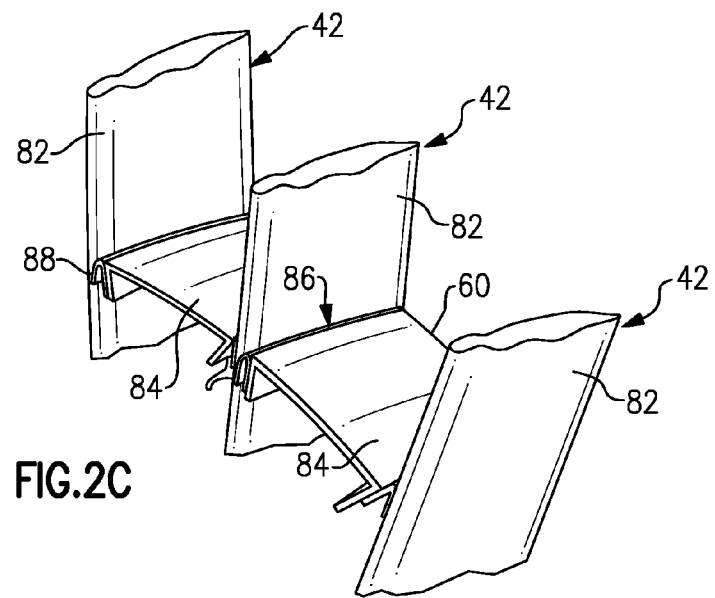
FIG. 2C is a schematic perspective view of the fan section with a nose cone removed.

The fan section 22 is shown in more detail in FIGS. 2A-2C. The fan section 22 includes multiple circumferentially arranged fan blades 42. Platforms 60, or spacers, are arranged between adjacent fan blades 42 and may be integral with or discrete from the fan blades 42. Referring to FIGS. 2A and 2B, the fan blades 42 are mounted to a fan hub 62. In one example, the fan hub 62 is constructed from a titanium material. A nose cone 64 is arranged forward of the fan blades 42 to provide an aerodynamic inner flowpath through the fan section 22 along with the platforms 60. The nose cone 64 is provided by a spinner 66 secured to the fan hub 62 by fasteners 68. A cap 70 is secured to the spinner 66 by fasteners 72. A one-piece nose cone may also be used.

Referring to FIG. 2B, the platform 60 includes first and second flanges 74, 76 secured to corresponding attachment features on the fan hub 62 respectively by fasteners 78, 80. The fasteners 68, 72, 78, 80 are schematically depicted in FIGS. 2A and 2B by simple, thickened lines for clarity. The arrangement shown in FIG. 2B is exemplary, and other platform configurations may be used, if desired.

Referring to FIG. 2C, each fan blade 42 has an airfoil 82. Each platform 60 has an outer surface 84, which together form a ring with the other platforms 60, spaced about axis A to provide an aerodynamic inner flow path surface. Though close fitting, a circumferential gap 86 exists between each platform outer surface 84 and an adjacent fan blade 42. Each gap 86 is blocked with a seal 88 to minimize a loss of airflow through the gas turbine engine 10.

Figure 3A:
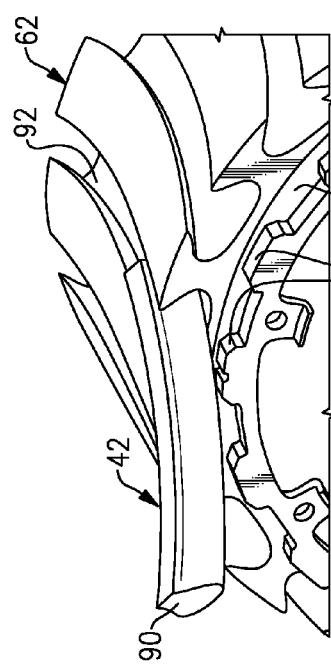
FIG. 3A is a perspective view of a fan blade root being installed into a fan hub.
Figure 3B:
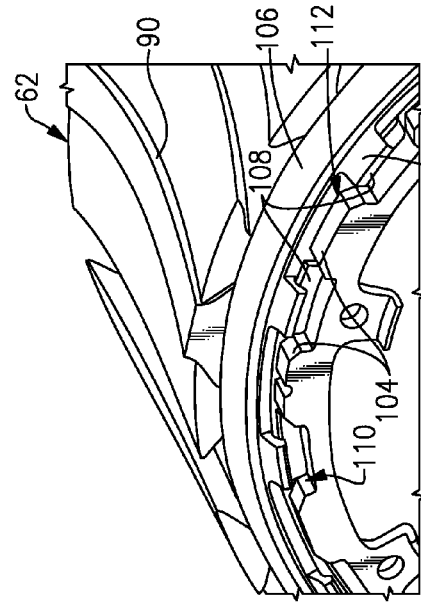
FIG. 3B is a perspective view of a lock ring in an unlocked position relative to the fan hub.
Figure 3C:
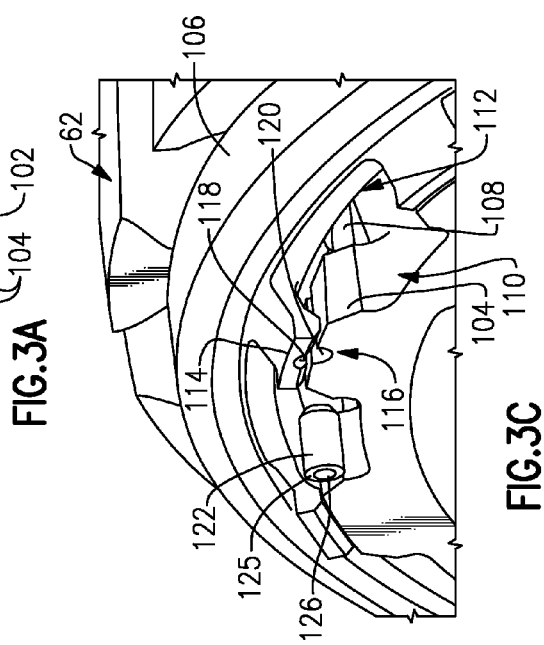
FIG. 3C is a perspective view of the lock ring in the locked position relative to fan hub and an uninstalled discrete pin used to secure the lock ring with respect to the fan hub.
Figure 3D:
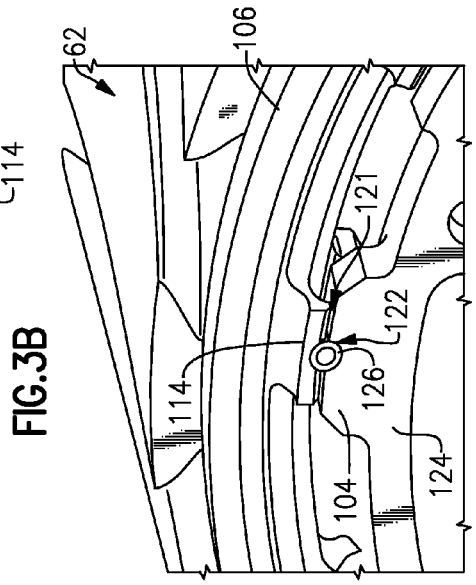
FIG. 3D is a perspective view of the pin inserted into an aperture provided by aligned slots in the lock ring and fan hub.
Figure 4:
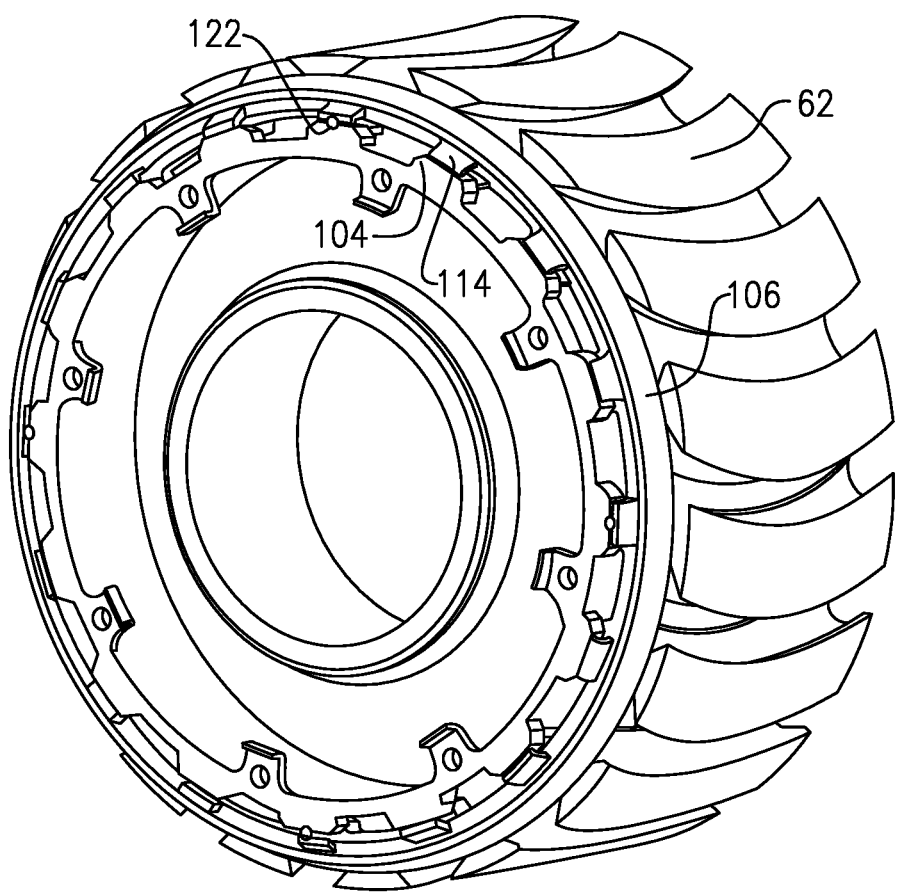
FIG. 4 is a perspective view of the assembled lock ring.

Referring to FIGS. 3A-4, circumferentially arranged slots 92 are provided in the fan hub 62 and slidably receive roots 90 of the fan blades 42 (only the roots are depicted in FIGS. 3A and 3B). Hub tabs 104 extend radially outward and are axially spaced from the slots 92. The fan hub 62 includes an annular recess 102 provided axially between the slots 92 and the circumferentially spaced hub tabs 104. With the fan blades 42 installed, an end of the root 90 is adjacent to the annular recess 102, best shown in FIG. 5.

Referring to FIG. 3B, a lock ring 106 is slid onto the fan hub 62 to the unlocked position illustrated in FIG. 3B. In one example, the lock ring may be constructed from a titanium, steel or nickel material. The lock ring 106 includes circumferentially spaced apart ring tabs 108 that extend radially inward. The ring tabs 108 are aligned with first circumferential spaces 110, and the hub tabs 104 are aligned with second circumferential spaces 112 provided between the ring tabs 108.

With the ring tabs 108 arranged within the annular recess 102, the lock ring 106 is rotated to at least partially align the hub tabs 104 and ring tabs 108 to a locked position, illustrated in FIG. 3C. In the locked position, the back side of the lock ring 106 abuts the root 90, as best shown in FIG. 5.

Returning to FIGS. 3C and 4, the lock ring 106 includes axially extending flanges 114. In the example, axially extending apertures 116 are provided in the fan hub 62 and the lock ring 106 with the lock ring 106 in the locked position. In the example shown, each aperture 116 is provided by first and second arcuate slots 118, 120, which are respectively provided by the flange 114 and the hub tab 104. A pin 122 having an end 125 with a threaded hole 126 is used to rotationally lock the lock ring 106 to the fan hub 62. The threaded hole 126 is provided in the end 15 of the pin 122 and is configured to receive a removal tool, such as a threaded end of a slide hammer. In one example, the pin 122 is constructed from stainless steel or nickel.

Referring to FIGS. 3D and 4, the pin 122, which is cylindrical in the example, is inserted into a corresponding aperture 116 provided by a pair of first and second arcuate slots 118, 120 in an interference fit such that the pin 122 engages the hub tab 104 and flange 114. It should be understood that the pins and slots may be of any suitable shape, e.g., square, rectangular, and/or elliptical. With the discrete pins 122 installed, the lock ring 106 is radially centered relative to the fan hub 62 to provide a radially space 121 between the flanges 114 and their corresponding hub tabs 104. In this manner, the lock ring 106 may serve as a pilot for other structures, such as the nose cone 64. The end 125 of the pin 122 is generally flush with a face 124 of the hub tab 104.

Figure 5:
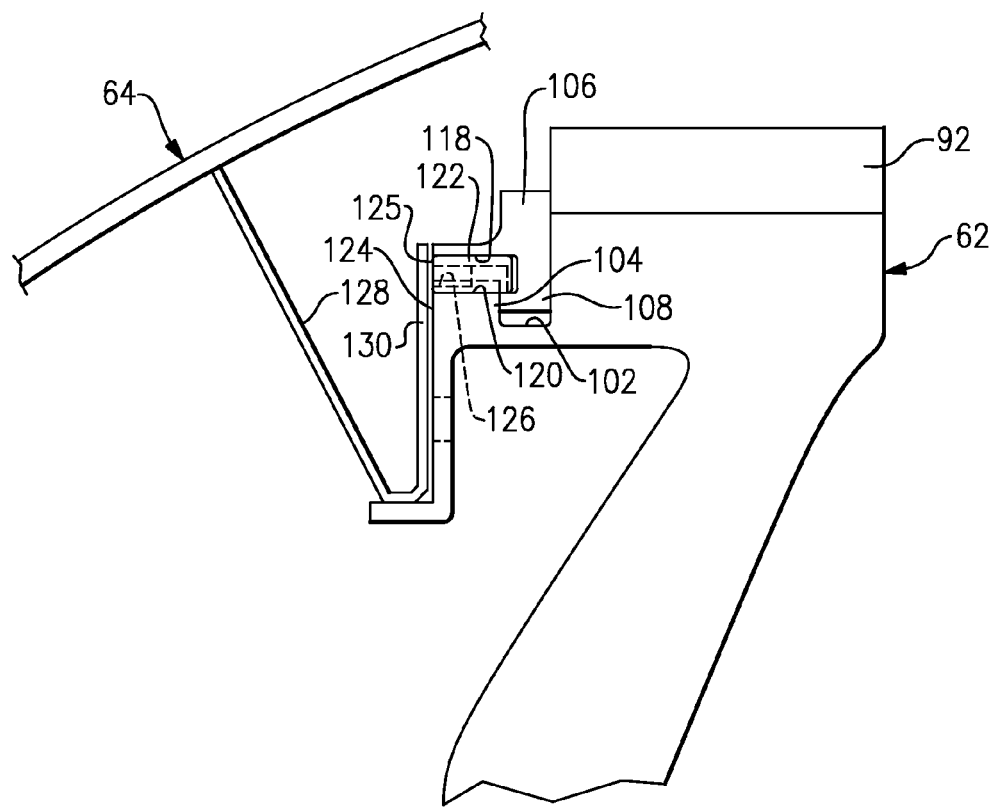
FIG. 5 is a schematic cross-sectional view of the assembled blade lock assembly with the nose cone installed.

Referring to FIG. 5, the nose cone 64 is secured to the fan hub 62 directly and/or indirectly. In the example, an attachment bracket 128 is schematically illustrated as connecting the nose cone 64 to the fan hub 62. A retainer 130, which may be integrated to the bracket 128, is arranged adjacent to the pins 122 to prevent the pins 122 from backing out during engine operation.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine fan blade lock assembly comprising:
   a fan hub having blade slots each configured to receive a root of a fan blade, the fan hub including circumferentially spaced first slots;
   a lock ring configured to move between unlocked and locked positions, the lock ring including circumferentially spaced second slots aligned with the first slots in the locked position; and
   multiple discrete pins, each pin configured to be slidably received in paired first and second slots that provide a radial gap there between in the locked position to prevent rotational movement of the lock ring relative the fan hub, the pin engaging the lock ring and the fan hub at the radial gap in an interference fit.

2. The gas turbine engine fan blade lock assembly according to claim 1, wherein the first and second slots are arcuate in shape and receive the pin.

3. The gas turbine engine fan blade lock assembly according to claim 2, wherein the pin is cylindrical in shape.

4. The gas turbine engine fan blade lock assembly according to claim 3, wherein the pin includes an end with a threaded hole configured to cooperate with a tool during a removal procedure.

5. The gas turbine engine fan blade lock assembly according to claim 1, wherein the fan hub includes hub tabs circumferentially spaced apart from one another to provide first circumferential spaces between the hub tabs, and the lock ring includes circumferentially spaced ring tabs that are received in the first circumferential spaces in the unlocked position.

6. The gas turbine engine fan blade lock assembly according to claim 5, wherein the lock ring includes second circumferential spaces provided between the ring tabs and receiving the hub tabs in the unlocked position.

7. The gas turbine engine fan blade lock assembly according to claim 5, wherein the ring tabs are received in an annular space provided between the hub tabs and the blade slots, the hub tabs and ring tabs at least partially circumferentially aligned with one another in the locked position.

8. The gas turbine engine fan blade lock assembly according to claim 5, wherein the pin includes an end that is flush with a face of the hub tab in the locked position.

9. The gas turbine engine fan blade lock assembly according to claim 8, comprising a retainer blocking the pin end.

10. The gas turbine engine fan blade lock assembly according to claim 9, wherein a nose cone provides the retainer.

11. The gas turbine engine fan blade lock assembly according to claim 1, comprising a fan blade mounted within the blade slot, and the lock ring adjacent to the root.

12. A method of assembling a fan section of a gas turbine engine comprising the steps of:
   mounting fan blades into a fan hub;
   sliding a lock ring onto the fan hub;
   rotating the lock ring to axially retain the fan blades within the fan hub; and inserting discrete pins into a radial gap between aligned apertures in the fan hub and lock ring in an interference fit to prevent relative rotational movement between the lock ring and fan hub.

13. The method according to claim 12, wherein the mounting step includes sliding roots of the fan blades into the corresponding slots in the fan hub.

14. The method according to claim 13, wherein the sliding step includes axially sliding the lock ring onto the fan hub with ring tabs of the lock ring received in circumferential spaces provided between hub tabs of the fan hub.

15. The method according to claim 14, wherein the rotating step includes circumferentially aligning at least a portion of the hub tabs with the ring tabs, wherein the lock ring axially blocks the axial movement of the fan blade roots.

16. The method according to claim 12, wherein the pins are received in the interference fit in arcuate slots providing the apertures.

17. The method according to claim 16, wherein the method of assembly includes a method of reassembly, wherein the pins are slidingly hammered from the slots.

* * * * *